(12) United States Patent
Tempea (10) Patent No.: US 8,284,478 B2
(45) Date of Patent: Oct. 9, 2012

(54) DEVICE FOR INCREASING THE SPECTRAL BANDWIDTH OF OPTICAL PULSES AS WELL AS AN ARRANGEMENT AND A METHOD FOR REDUCING THE DURATION OF OPTICAL PULSES WITH THE USE OF SUCH A DEVICE

(75) Inventor: Gabriel-Florin Tempea, Vienna (AT)

(73) Assignee: Femtolasers Produktions GmbH (AT)

( * ) Notice: Subject to any disclaimer, the term of this patent is extended or adjusted under 35 U.S.C. 154(b) by 183 days.

(21) Appl. No.: 12/826,917

(22) Filed: Jun. 30, 2010

(65) Prior Publication Data

US 2012/0002269 A1    Jan. 5, 2012

(51) Int. Cl.
*G02F 1/35*    (2006.01)
*H01S 3/20*    (2006.01)

(52) U.S. Cl. .......................... 359/332; 372/55
(58) Field of Classification Search .................. None
See application file for complete search history.

(56) References Cited

U.S. PATENT DOCUMENTS

| 5,956,173 | A | * | 9/1999 | Svelto et al. | 359/332 |
| 6,151,155 | A | * | 11/2000 | Durfee et al. | 359/332 |
| 2011/0007772 | A1 | * | 1/2011 | Popmintchev et al. | 372/55 |

FOREIGN PATENT DOCUMENTS

| JP | 2000-214500 | 8/2000 |
| JP | 2007-256388 | 10/2007 |

OTHER PUBLICATIONS

International Search Report mailed Aug. 24, 2011, in corresponding International Application No. PCT/EP2011/058358 and Notification of Transmittal of the International Search Report and the Written Opinion of the International Searching Authority (5 pages).
A. Anderson et al., "Compact Hollow Fiber Compression Scheme for Multi-mJ Pulse Generation", Solid State Lasers XIX: Technology and Devices 24-28 (2010), pp. 75781T-1-75781T-4, vol. 7578 XP009151016.
D. Homoelle et al. "Nonlinear propagation dynamics of an ultrashort pulse in a hollow waveguide", Opt. Lett., vol. 25, No. 10, (2000) pp. 761-763, XP009151022.
T. Pfeifer et al., "Direct experimental observation of periodic intensity modulation along a straight hollow-core optical waveguide", Journal of the Optical Society of America B (Optical Physics) Opt. Soc. America USA, vol. 24, No. 5 (2007) pp. 1025-1029, XP 009151021.

* cited by examiner

*Primary Examiner* — Hemang Sanghavi
(74) *Attorney, Agent, or Firm* — Ostrolenk Faber LLP (57) ABSTRACT

A device for increasing the spectral bandwidth of optical pulses, comprises a hollow fiber waveguide, optical components for focusing the beam into the hollow fiber waveguide and for re-collimating the beam at the exit of the hollow fiber waveguide, the hollow fiber waveguide being contained in an air-tight chamber filled with a gas at a given pressure; the length of the hollow fiber is such that, for a given input pulse energy and gas pressure, the energy contained in a fundamental propagation mode of the optical pulses that has minimum propagation losses exhibits substantially periodic oscillations over the full length of the hollow fiber waveguide and reaches a local maximum at the output end of the said hollow fiber waveguide.

24 Claims, 5 Drawing Sheets

DEVICE FOR INCREASING THE SPECTRAL BANDWIDTH OF OPTICAL PULSES AS WELL AS AN ARRANGEMENT AND A METHOD FOR REDUCING THE DURATION OF OPTICAL PULSES WITH THE USE OF SUCH A DEVICE

FIELD OF INVENTION

The invention generally relates to a hollow fiber compression scheme for energetic femtosecond pulses.

More in detail, the invention concerns a device for increasing the spectral bandwidth of optical pulses, said device comprising a hollow fiber waveguide having an input end and an output end, optical components for focusing the beam into the hollow fiber waveguide and for re-collimating the beam at the output end of the hollow fiber waveguide, the said hollow fiber waveguide being contained in an air-tight chamber filled with a gas at a given pressure, the compact table-top device for increasing the spectral bandwidth of multi-mJ femtosecond pulses.

Furthermore, the invention is directed to an arrangement where such a device is used, and to a corresponding method, namely for reducing the duration of optical pulses.

BACKGROUND OF INVENTION

Few-cycle intense femtosecond pulses are an important and an enabling tool in time-resolved spectroscopy measurements and particularly in attosecond physics. However, despite essential progress in the development of chirped pulse amplifiers (CPAs), in practice, the shortest pulses generated from such a source have only reached 15 femtoseconds (fs). This is to be traced back to a fundamental limitation, namely gain narrowing in the laser crystal that results in reduced spectral bandwidths, and consequently in increased pulse durations. Hollow fiber compression (HFC) allows to overcome this limitation by broadening the spectrum of the pulses generated with femtosecond amplifiers. The spectrally broadened pulses are subsequently compressed in a negative dispersion delay line.

HFC relies on the nonlinear propagation of intense femtosecond pulses in gas-filled capillary tubes.

Figure 1:
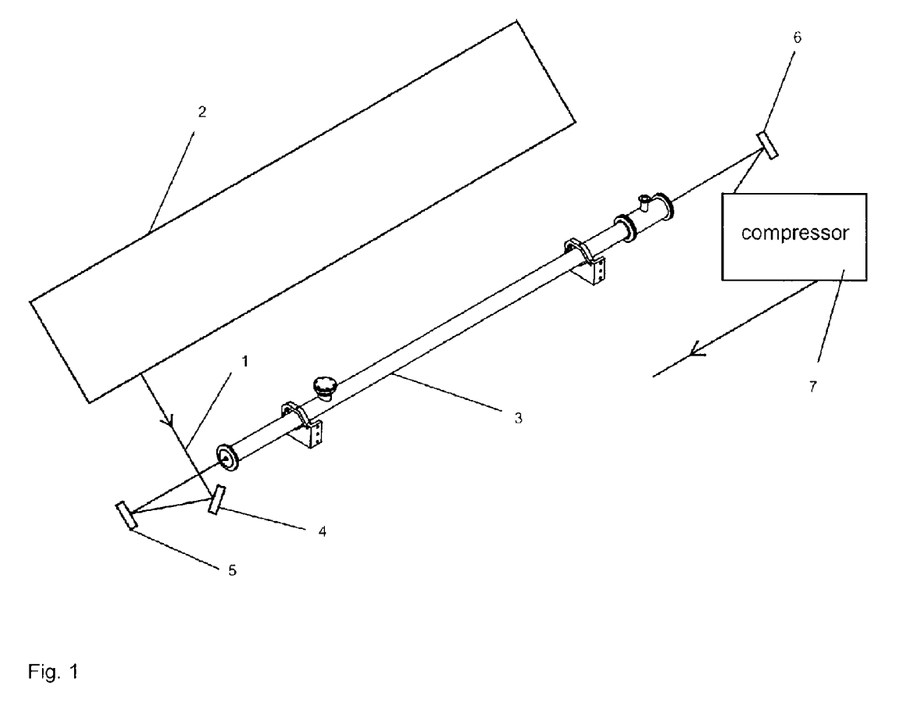
Figure 2:
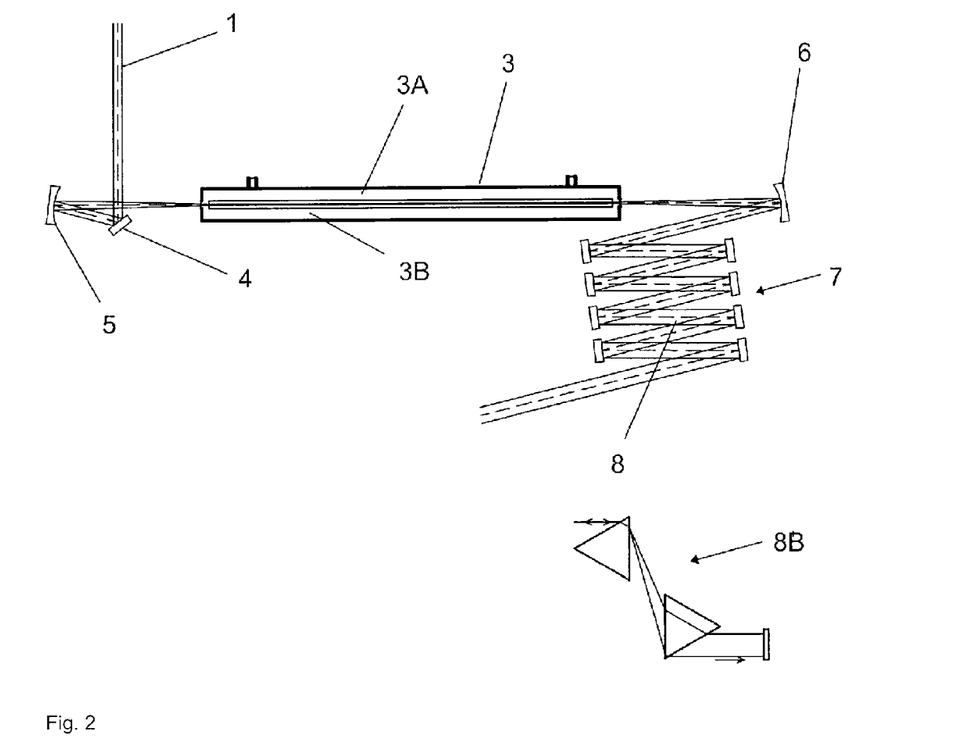
FIG. 2 again shows such a principle of a hollow fiber compressor setup, now in a schematically cross-section as far as the hollow fiber waveguide is concerned, and with a specific compressor embodiment comprising dispersive mirrors.

In FIG. 1, a schematic representation of an arrangement of a standard HFC setup is shown; in FIG. 2, a more detailed illustration of such a setup, partly in section, is given.

According to these FIGS. 1 and 2, a laser beam 1 generated in a laser amplifier 2 is coupled into a fiber waveguide 3, i.e. into a hollow fiber 3A (FIG. 2) placed in an air-tight hollow fiber chamber 3B via a folding mirror 4 and a focusing mirror 5. At the output of the chamber 3B, the beam is re-collimated with a mirror 6 and directed into a compressor 7, for instance comprised by a negative-dispersion delay line 8.

Figure 3:
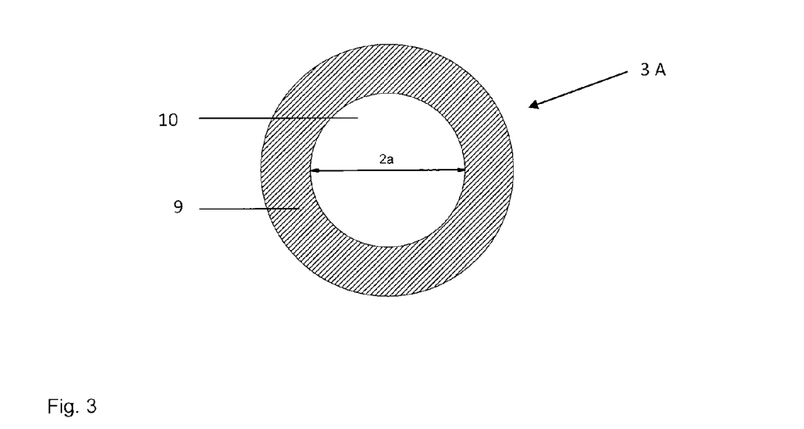
FIG. 3 shows a cross-section of a hollow fiber as is in principle known per se.

Furthermore, FIG. 3 shows a cross-section of a hollow fiber waveguide 3A consisting of a glass cladding 9 and hollow core 10 and having an inner diameter equal to 2 a.

Self-phase-modulation in a hollow fiber waveguide leads to spectral broadening while the spatial filtering properties of the waveguide ensure a transversally homogeneous spectral broadening and result in an excellent beam profile. Initially devised for sub-mJ pulses (see for instance M. Nisoli et al., "A novel-high energy pulse compression system: generation of multigigawatt sub-5-fs pulses", Appl. Phys. Lett. B 65 (1997): p. 189-196), the method enabled the generation of sub-TW few-cycle pulses at KHz repetition frequencies from table-top systems. Subsequently, CPAs equipped with HFCs became the working horse of many femto- and atto-second physics laboratories around the world. However, several applications including high-photon yield high order harmonic generation, the generation of high-photon energy harmonic radiation, or the investigation of relativistic laser field-matter interactions call for few-cycle driving laser pulses with energies in excess of 1 mJ. With CPAs supplying multi-mJ pulses with durations in the range of 30-50 fs widely available, energy up-scaling of pulse compressors gained paramount importance for the development of laser sources for strong-field physics. However, energy up-scaling of HFC is not trivial since several phenomena affect the performance of HFCs when the pulse energy is increased beyond 1 mJ, as for instance ionization of the propagation medium, damage of the fiber entrance, self-phase modulation and self-focusing in front of the fiber.

Light propagation in a hollow fiber waveguide can be described by decomposing the optical field in discrete spatial modes with transversal mode profiles given by $$V_{jp} = J_j(u_{jp} r/a)$$

where $J_j$ with $j=0,1,\ldots$ is the Bessel function of order j;

$u_{jp}$ with $p=1,2,\ldots$ is the $p^{th}$ root of the equation $J_j(u_{jp})=0$;

r is the radial coordinate (in a cylindrical coordinates system having its symmetry axis collinear with the symmetry axis of the hollow fiber); and a is the fiber radius (see FIG. 3).

The longitudinally polarized (LP) modes having a spatial profile $V_{jp}$ are dubbed the $LP_{jp}$ modes. The complex propagation constant $k_{jp}$ of the mode jp is given by $$k_{jp}(\omega) = \beta_{jp}(\omega) + i\alpha_{jp}(\omega)$$

with $\omega$ being the angular frequency of the laser light; and $\beta_{jp}$, $\alpha_{jp}$ being the real, respectively imaginary parts of the propagation constant.

The modes thus have different attenuation constants $\alpha_{jp}(\omega) = 2.814 u_{jp}/a^3 [\lambda/(2\pi)]^2$, with $\lambda$=wavelength of the laser light;

and this accounts for the spatial filtering properties of the fiber.

The mode $LP_{01}$ exhibits the smallest propagation losses and is referred to as fundamental or lowest-order mode. This mode $LP_{01}$ has a profile given by a first order Bessel function (compare also FIG. 4, full line graph) that has zero-transitions at the fiber walls (i.e. for $r=+a$ and $r=-a$) and is a very close approximation of a Gaussian mode, and it can be efficiently focused by means of standard optics. Modes of increasingly higher order have increasingly complex transversal profiles that deviate significantly from a Gaussian profile and result in a poor focusability of the beam. The first order mode $LP_{02}$ (compare FIG. 4, graph in dotted line), for instance, is given by a first order Bessel function that has zero-transitions at the fiber walls (for $r=a$ and $r=-a$) and additionally two minima within the fiber core; this mode has the second-lowest propagation losses. Propagation through the fiber discriminates thus among the modes, and after a sufficiently long propagation distance the energy will be substantially contained in the (well-focusable) fundamental mode $LP_{01}$ since higher-order modes experience much stronger attenuation.

In the presence of a nonlinear effect occurring during propagation in the waveguide (either the Kerr-effect or ionization), energy is coupled from the fundamental mode $LP_{01}$ to higher-order modes (cf. G. Tempea and T. Brabec, "Theory of self-focusing in a hollow wa-waveguide", Opt. Lett. 23 (10) (1998): p. 762-764) which might lead to a degradation of the beam profile. Given the extremely high losses and low coupling coefficients of modes with j>2, it is sufficient to consider only coupling to the mode $LP_{02}$ for the analysis of this phenomenon. The difference between the real parts $\beta_{01}(\omega)$ and $\beta_{02}(\omega)$ of the propagation constants $k_{jp}$ of the modes $LP_{01}$ and $LP_{02}$ and between their first order derivatives (with respect to the angular frequency $\omega$) leads to phase mismatch (i.e. the phase of the two modes changes at different rates during propagation), or to group velocity mismatch, respectively (the two modes propagate with different velocities) between the modes. These phenomena can be quantified by means of the following parameters: the phase-mismatch length $L_{p12}$ can be described as $$L_{p12}=\lambda_0/[4\pi a^2(u_{02}^2-u_{01}^2)], \text{ with}$$

$\lambda_0$=carrier wavelength of the pulse to be compressed ($L_{p12}$ being equal to $2\times10^{-6}\times a^2$ for a center wavelength $\lambda_0$ of 800 nm) and is the propagation length required for a phase difference of $\pi$ to build up between the phases of the modes $LP_{01}$ and $LP_{02}$; the group-velocity mismatch length $L_{v12}$ can be described as $$L_{v12}=2\tau_{FWHM}cL_{p12}/\lambda_0,$$

with $\tau_{FWHM}$=half maximum pulse duration; and
c=speed of light in vacuum, and is the propagation length required for a delay equal to the full width at half maximum pulse duration $\tau_{FWHM}$ to build up between the modes $LP_{01}$ and $LP_{02}$.

The physical meaning of these two quantities is the following: energy is coupled from the mode $LP_{01}$ and $LP_{02}$ as long as the phase difference between the two modes is <$\pi$, i.e. for propagation length $l<L_{p12}$. Subsequently, energy is coupling back to the fundamental mode LP01 for propagation lengths $L_{P12}<l<2 L_{P12}$ and this process of periodic energy transfer between the modes $LP_{01}$ and $LP_{02}$ is repeated as long as there is still significant temporal overlapping between the pulses propagating with the two spatial modes, i.e. for lengths $l<L_{v12}$.

Corresponding to the three phenomena governing mode-coupled propagation (phase-mismatch, group velocity mismatch and mode-dependent losses), three regimes A, B, C of propagation can be identified:

(A) The Phase-mismatched Periodic Mode-coupling Propagation:
  The group velocity mismatch has negligible effects (i.e. pulses having spatial modes $LP_{01}$ and $LP_{02}$ propagate almost synchronously); the energy transfer between $LP_{01}$ and $LP_{02}$ is periodic due to phase-mismatch.

(B) Reduced-coupling Propagation:
  The group velocity mismatch reduces the temporal overlapping between the pulses significantly; furthermore, pulse stretching and losses result in reduced nonlinearity and, therewith, in reduced mode coupling; the power of the mode $LP_{02}$ is already reduced due to the large propagation losses.

(C) De-coupled Propagation:
  The delay between the pulses traveling in the two propagation modes becomes comparable with the duration of the pulses resulting in negligible temporal overlap; pulse broadening and losses reduce nonlinear mode-coupling to negligible levels. The two modes propagate substantially independently, exhibiting the mode-specific propagation losses; after sufficiently long propagation distances, the energy contained in the $LP_{02}$ mode will be negligible in comparison to the energy contained in the fundamental mode.

Hollow fiber compression schemes proposed so far rely on the loss-related mode discrimination mechanism; the fiber length is chosen such that the transmittance of the mode $LP_{02}$ is negligible as compared to the transmittance of the mode $LP_{01}$ (see U.S. Pat. No. 5,956,173 A; and M. Nisoli et al., "A novel-high energy pulse compression system: generation of multigigawatt sub-5-fs pulses", Appl. Phys. Lett. B 65 (1997): p. 189-196; in particular p. 190, FIG. 1b and the corresponding discussion at the end of section 1). This method is well applicable for the compression of pulses with energies of approximately 1 mJ and slightly beyond, where fibers with diameters up to 200 μm-300 μm can be used. Compression of more energetic pulses (with energies well beyond 1 mJ) calls for the use of fibers with larger diameters in order to avoid excessive nonlinearities and/or damage of the fiber entrance. However, the loss-related mode discrimination of the fiber decreases rapidly with increasing fiber radius a according to the formula:

$$(\alpha_{01}(\omega)-\alpha_{02}(\omega))=2.814(u_{01}-u_{02})/a^3[\lambda/(2\pi)]^2$$

Consequently, very long fibers need to be used in order to achieve proper mode filtering. In order to compress 30 fs/5 mJ pulses to 5 fs/2.5 mJ pulses, in practical tests (S. Bohman et al., Opt. Express 16 (2008): p. 10684), a fiber with a diameter of 500 μm and having a length of 2.2 m was used. Additionally, a differentially pumped chamber (that was evacuated at the extremity where the pulses were coupled) had to be used in order to reduce nonlinear effects in front of the fiber, and therewith to reduce the energy coupled into the higher-order mode $LP_{02}$ at the fiber entrance (input end). The differential-pumping scheme adds significant complexity to the setup, while the length of the HFC chamber alone was approximately 4 m, exceeding thus the size of a typical table-top setup.

SUMMARY OF THE INVENTION

It is now an object of the invention to provide a hollow fiber waveguide device as mentioned above with which it is possible to increase the spectral bandwidth of multi-mJ optical pulses, and this by having a compact, table-top layout of the device.

It is a further object of the invention to provide a hollow fiber compressor arrangement for reducing the duration of optical pulses which is capable of generating multi-mJ pulses with good beam profile.

Furthermore, it is an object of the invention to provide a corresponding method for reducing the duration of optical pulses in an efficient, yet comparably simple manner, that in addition ensures a good beam profile.

According to a first aspect, the invention provides a device for increasing the spectral bandwidth of optical pulses, said device comprising a hollow fiber waveguide having an input end and an output end, optical components for focusing the beam into the hollow fiber waveguide and for re-collimating the beam at the output end of the hollow fiber waveguide, the hollow fiber waveguide being contained in an air-tight chamber filled with a gas at a given pressure, wherein the length of the hollow fiber is such that, for a given input pulse energy and gas pressure, the energy contained in a fundamental propagation mode, $LP_{01}$, of the optical pulses that has minimum propagation losses exhibits substantially periodic oscillations over the full length of the hollow fiber waveguide and reaches a local maximum at the output end of the said hollow fiber waveguide.

Preferably, the length of the hollow fiber wave-waveguide is substantially equal to an even integer multiple of a phase-mismatch length $L_{p12}$, with $$L_{p12} = 2 \times 10^{-6} \times a^2,$$

where
a is the radius of the hollow fiber waveguide.

Further, it is preferred that the length of the hollow fiber waveguide is shorter than a group velocity mismatch length $L_{v12}$, with $$L_{v12} = 2\tau_{FWHM} c L_{p12}/\lambda_0 = 4 \times 10^{-6} \tau_{FWHM} c a^2/\lambda_0, \text{ where}$$

a is the radius of the hollow waveguide;
$\lambda_0$ is the carrier wavelength of the pulse to be compressed;
$\tau_{FWHM}$ is the full width at half maximum duration of the pulse to be compressed; and
c is the speed of light in vacuum.

The hollow fiber waveguide may e.g. be made of fused silica or BK7 glass.

Furthermore, the hollow fiber waveguide may simply be a cylindrical tube.

To avoid damages to the input end of the hollow fiber waveguide due to beam-pointing drifts causing the beam to impinge on the cladding of the hollow fiber waveguide, it is preferred that the hollow fiber waveguide has a cylindrical section and a substantially conical section at the input end, the optical pulses being coupled into the conical input end of the hollow fiber waveguide; or that the hollow fiber waveguide has an axis of symmetry, and is cleaved under an angle different from 90° with respect to the axis of symmetry.

The hollow fiber waveguide may preferably be filled with one of the following gases: Xe, Kr, Ar, Ne, He, N2, air.

According to a second aspect, the invention provides an arrangement for reducing the duration of optical impulses, that arrangement comprising a device as defined above, and further comprising a group delay dispersion compensation device.

This group delay dispersion compensation device may, for instance, comprise one or more prism pairs; one or more grating pairs; grating pairs and prism pairs; most preferably dispersive mirrors; or dispersive mirrors and one or more prism pairs.

According to a third aspect, the invention provides a method for reducing the duration of optical pulses comprising the steps:

that light pulses are coupled by means of focusing optics into a hollow fiber waveguide that has an input end and an output end, and is contained in an air-tight chamber filled with a gas, wherein the length of the hollow fiber waveguide is such that, for a given input pulse energy and gas pressure, the energy contained in a fundamental propagation mode, $LP_{01}$, that has minimum propagation losses exhibits substantially periodic oscillations over the full length of the hollow fiber waveguide end reaches a local maximum at the output end of the hollow fiber waveguide;

that the bandwidth of the said optical pulses is enlarged by means of nonlinear propagation in the gas-filled hollow fiber waveguide;

that the optical pulses are spatially re-collimated by optical means after exiting at the output end of the hollow fiber waveguide and the air-tight chamber; and that the spectrally broadened optical pulses are caused to propagate through a group delay dispersion compensation device where their duration is reduced.

As already mentioned, the hollow fiber waveguide preferably has a cylindrical section, and has a conical section at the input end, the light being coupled in at the conical input end; here, it is particularly preferred that coupling of the optical pulses into the hollow fiber waveguide is achieved by focusing the beam to a diameter equal to 60-80% percent of the diameter of the cylindrical section of the hollow fiber waveguide; or that coupling of the optical pulses into the hollow fiber waveguide is achieved by focusing the beam to a diameter equal to 60-80% percent of the maximum diameter of the conical section of the hollow fiber waveguide.

BRIEF DESCRIPTION OF THE DRAWINGS

The invention is described now in more detail with reference to preferred embodiments to which the invention, however, should not be limited, and on the basis of the accompanying drawings in which FIG. 1 schematically shows the principle of a hollow fiber compressor setup including a device for increasing the spectral bandwidth of optical pulses which may be carried in accordance with the present invention;

FIG. 6 shows, in its part FIG. 6A, the entrance of a laser beam into a hollow fiber and its passage therethrough, and in its part FIG. 6B, schematically the periodic variation of the power propagating in the fundamental mode ($LP_{01}$) over the fiber length;

First, with reference to FIG. 1 to 4, these Figures have already been referred to in the above part of the description. However, it should be mentioned with respect to FIG. 2 that it is also possible to build up the compressor 7 with one or more prism pairs 8', as has been shown schematically in FIG. 2 outside of the dispersive mirror compressor 8, or with one or more grating pairs, or with combinations of grating pairs and prism pairs, or with combinations of dispersive mirrors and one or more prism pairs. All these embodiments of compressor 7 operate to re-compress the pulses outputted from the hollow fiber waveguide 3, as is known per se.

In FIG. 3, the cross-section of a hollow fiber 3A of a waveguide 3 is schematically shown, and it may be seen from this illustration that the radius of the hollow core 10 of this hollow fiber 3A is a, the whole inner diameter being equal to 2 a.

Figure 4:
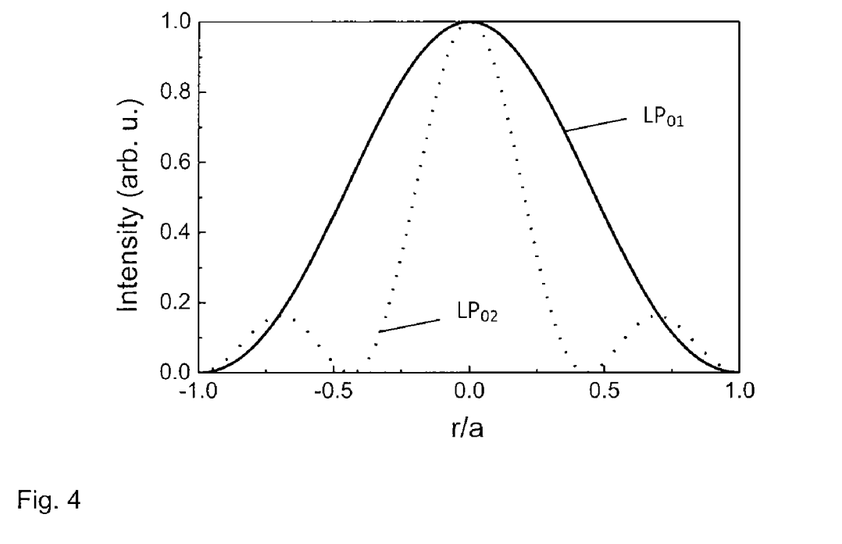
FIG. 4 shows a scheme, i.e. a cross-section, of the intensity beam profile of longitudinally polarised laser modes $LP_{01}$ (fundamental mode; in full line) and $LP_{02}$ (first-order mode; in dotted line)

With reference to FIG. 4, the intensity, in arbitrary units vs. the radius r of the beam, normalized to the hollow fiber radius a, is shown, to illustrate a schematic cross-section of the intensity beam profile of the fundamental $LP_{01}$ and of the first order mode $LP_{02}$.

Here, it may be reminded that it is an object of this invention to devise hollow fiber compressor means which are capable to generate multi-mJ pulses with a good beam profile, from a compact setup. Furthermore, as pointed out above, the approach relying on the difference in the transmittance of the fiber 3A for the modes $LP_{01}$ and $LP_{02}$ and on differentially pumped chambers fails to fulfill these requirements.

Figure 6A:
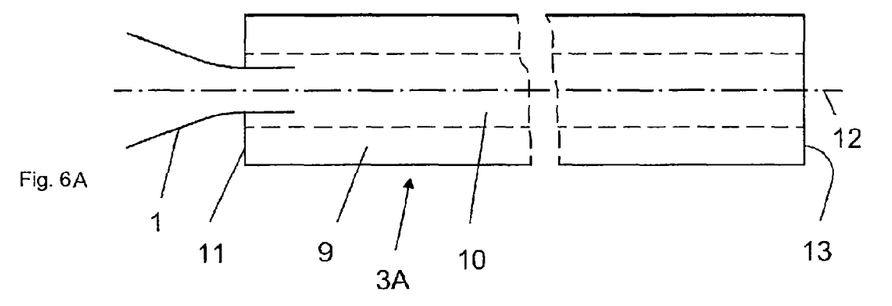
Figure 6B:
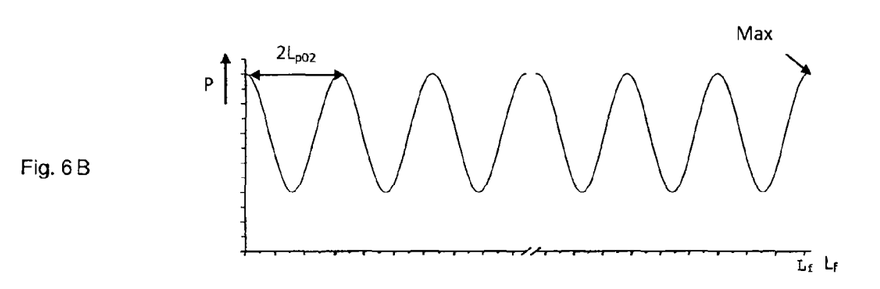

The solution here proposed draws on the periodic energy transfer between the modes $LP_{01}$ and $LP_{02}$ (corresponding to the above regime (A) of propagation) that takes place over distances that are much shorter than the length required to suppress the mode $LP_{02}$ via losses, resulting thus in a much more compact setup, with substantially reduced fiber length $L_f$ (FIG. 6B). Furthermore, the present approach obviates the need to use a differentially pumped fiber, since energy initially coupled to the first order mode $LP_{02}$ at the entrance of the fiber 3A can be transferred back to the fundamental mode $LP_{01}$ via nonlinear propagation. Indeed, for propagation lengths equal to an even integer multiple of the phase-mismatch length $L_{p12}$, the pulse energy contained in the first order mode $LP_{02}$ is coherently coupled back into the fundamental mode $LP_{01}$ (see FIG. 6B in combination with FIG. 6A), resulting thus in an excellent beam profile. The fiber length $L_f$ will thus fulfill the following conditions:

$$L_f = 2 * N * L_{p12}, L_f < L_{v12},$$

where N is a positive integer number.

Figure 5:
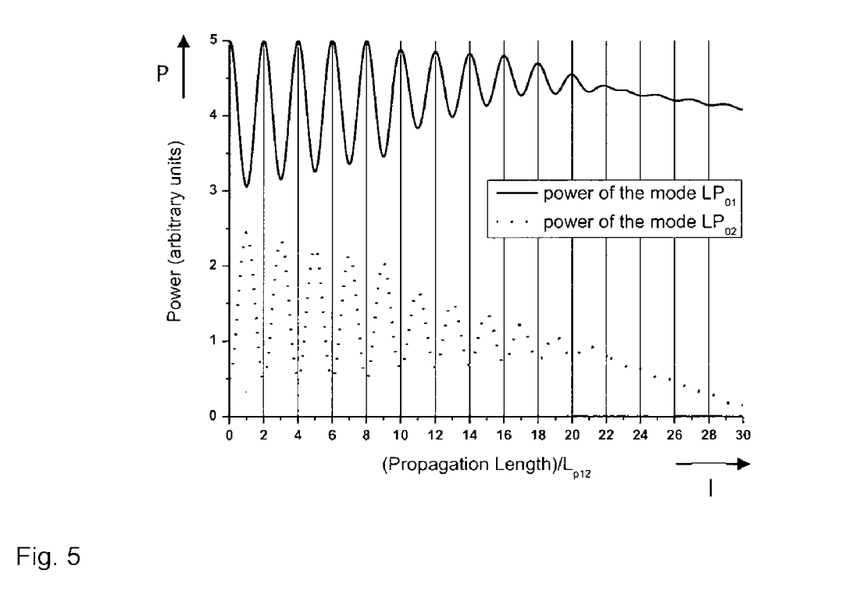
FIG. 5 shows a graph illustrating a qualitative depiction of the evolution of the power P contained in the fundamental mode $LP_{01}$ (in full line) and in the first-order mode $LP_{02}$ (in dots) in arbitrary units, as a function of propagation length normalized to the phase-mismatch length $L_{p12}$.

This type of behavior (predicted in G. Tempea and T. Brabec, "Theory of self-focusing in a hollow waveguide", Opt. Lett. 23 (10) (1008): p. 762-764; by means of an approximate analytical model and confirmed by D. Homoelle and A. L. Gaeta, "Nonlinear propagation dynamics of an ultrashort pulse in a hollow waveguide", Opt. Lett. 25 (10) (2000): p. 761-763; by means of a thorough numerical analysis) is qualitatively illustrated in FIG. 5. The diagram depicts the evolution of the power P contained in the fundamental mode $LP_{01}$ and in the first-order mode $LP_{02}$ as a function of propagation length l qualitatively, based on the conclusions of the two above-mentioned publications. The above-mentioned phase-mismatched periodic mode-coupling propagation regime (A) consists in this example of eight phase-mismatch lengths $L_{p12}$, being followed by the regime (B) having a length of approximately $10 L_{p12}$. Finally, for lengths $>18 L_{p12}$, the two modes $LP_{01}$ and $LP_{02}$ are almost de-coupled and subjected to different propagation losses. It should be noted here that the lengths of the intervals corresponding to the above three regimes of propagation (A), (B) and (C), as well as the strength of the coupling between the two modes $LP_{01}$ and $LP_{02}$ (i.e. the amplitude of the periodic modulation) as depicted in FIG. 5 are arbitrarily chosen for illustration purposes and do not restrict the scope of the invention; these parameters are strongly dependent on the fiber diameter 2a, input power and gas pressure within the chamber 3B. However, irrespectively of the values of these parameters, one can always chose the length $L_f$ of the fiber 3A such that the propagation takes place mostly in the regime (A) and the power contained in the fundamental mode reaches a maximum at the output end of the fiber 3A. For the example depicted in FIG. 2, the compressor corresponding to the invention would have a length of either $2 L_{p12}$, $4 L_{p12}$, $6 L_{p12}$ or $8 L_{p12}$. Compressors based on the state of the prior art (U.S. Pat. No. 5,956,173 A, M. Nisoli et al., "A novel-high energy pulse compression system: generation of multigigawatt sub-5-fs pulses", Appl. Phys. B 65 (1997): p. 189-196) draw on the mode selectivity of the propagation losses (that—for the example illustrated in FIG. 5—can be clearly observed for fiber length $>10 L_{p12}$).

The approach here proposed results both in a better throughput for the fundamental mode $LP_{01}$ and in shorter fiber lengths $L_f$ leading to improved compactness.

With reference to FIG. 6 and in particular FIG. 6A, focusing of a laser beam 1 into a hollow fiber waveguide 3A is shown. In accordance with FIG. 3, the hollow fiber 3A has a glass cladding 9 and a hollow core 10. The entrance surface 11 of the hollow fiber 3A is normal to the axis of symmetry 12 of the waveguide 3. FIG. 6B shows then qualitatively how the power P which propagates in the fundamental mode $LP_{01}$ varies periodically. According to the invention, the length $L_f$ of the fiber 3A is matched such that the power P in the mode $LP_{01}$ reaches a local maximum Max at the output end 13 of the fiber 3A.

With the issue of compactness being such solved, one is still concerned with possible damage that might result from slight beam-pointing drifts causing the laser beam 1 to irradiate the cladding 9 of the hollow tube 3A at the entrance (input end). In the case of a conventional, cylindrical hollow waveguide (cf. FIG. 6), the intense, focused beam 1 drifting accidentally away from the hollow core irradiates the front surface 11 of the cladding 9 under near normal incidence.

Figure 7:
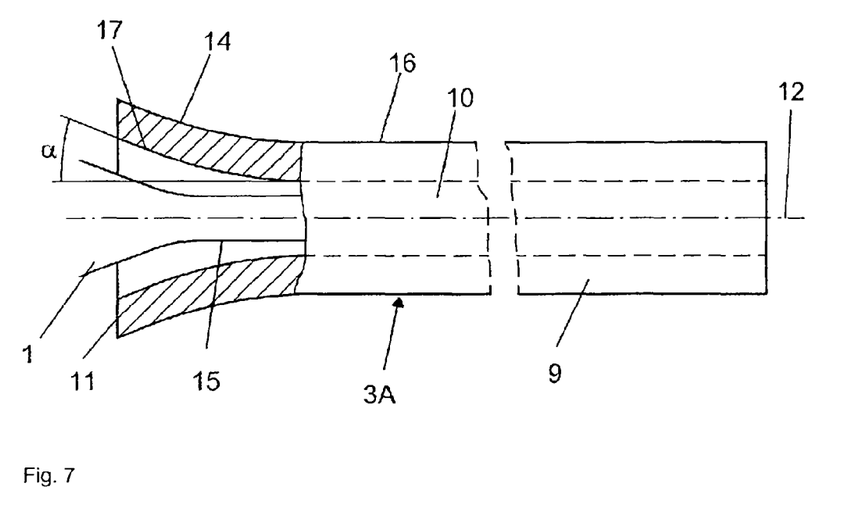
FIG. 7 schematically shows a laser beam which is focused into the input end of a hollow waveguide (hollow fiber) having a tapered, i.e. conical section and a joining cylindrical section, where the beam waist is matched for optimum coupling in the cylindrical section of the fiber.
Figure 8:
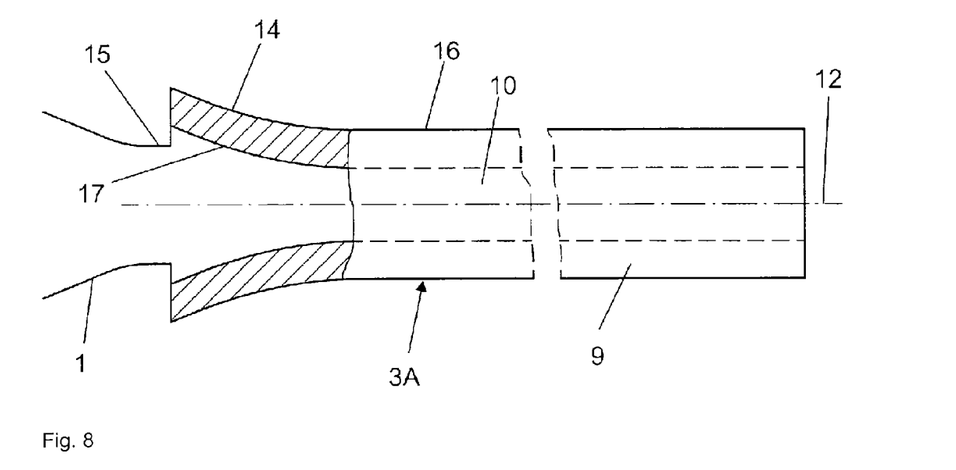
FIG. 8, in a similar illustration as in FIG. 7, shows a laser beam focused into a hollow fiber waveguide having a tapered, i.e. conical section and a joining cylindrical section, but now in the case where the beam waist is matched for optimum coupling into the conical section of the fiber.

The laser light fluence on the entrance surface 11 (and therewith the risk of accidental damage) can be reduced by employing a tapered, i.e. conical fiber section 14 at the entrance of the fiber 3A, as shown in FIG. 7 and FIG. 8. The beam waist 15 of the laser beam 1 will be matched for optimum coupling into a following cylindrical section 16 of the fiber 4A (to this end, the beam waist 15 should preferably amount to 60 to 80%, more preferred 60 to 70%, of the diameter of the cylindrical section of the fiber, as is known principally from the literature). In this case, should it drift, the laser beam 1 will not irradiate the front surface 11 of the fiber 3A, but the inner surface 17 of the cladding 9 under a large angle of incidence 90°−α, where α is the angle made by the inner surface of the cladding walls within the tapered section of the fiber with the symmetry axis of the fiber. With this approach, the laser fluence on the cladding 9 is reduced by $$4 * \tan^2 \alpha$$

as compared to a standard (non-tapered, cleaved under normal angle) hollow fiber. As an example, for a taper angle α=5°, the fluence is reduced by a factor of 0.031.

The beam waist 15 can also be matched for optimal coupling into the conical section 14 of the fiber 3A, as depicted in FIG. 8. In this case, the laser fluence at the fiber entrance 11 will be reduced due to the larger cross-section of the beam 1.

Figure 9:
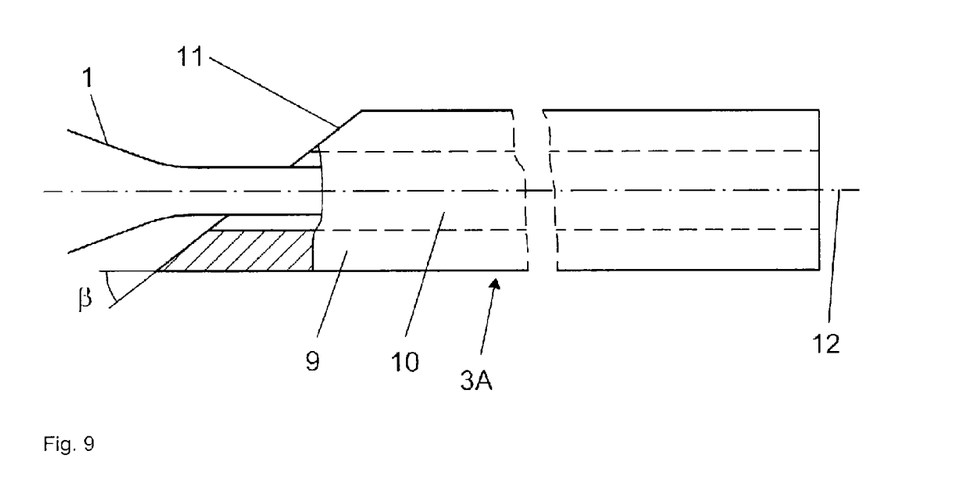
FIG. 9, again in a similar illustration as in FIG. 7 or 8, shows a laser beam focused into an input end of a cylindrical hollow waveguide, but now with the front end of the waveguide cleaved such that the entrance surface of the waveguide defines an acute angle β with the axis of symmetry of the waveguide.

Alternatively, one can cleave the hollow waveguide 3 under an oblique angle β, as is shown in FIG. 9 (in contrast to the standard cleaving that results in a surface perpendicular to the axis 12 of the fiber). If the fiber 3A is cleaved under an angle β, see FIG. 9, the laser fluence incident onto the lateral (front) surface 11 of the cladding 9 in case of beam drift will be reduced by $\sin^2 \beta$. For example, for a cleaving angle β=45°, the fluence will be reduced by a factor of $\sin^2 45° = 0.5$ as compared to the normal (90°) incidence cleaved fiber depicted in FIG. 6.

The invention claimed is:

1. A device for increasing the spectral bandwidth of optical pulses, said device comprising
a hollow fiber waveguide having an input end and an output end,
optical components for focusing a beam of optical pulses into the hollow fiber waveguide and for re-collimating the beam at the output end of the hollow fiber waveguide,
the hollow fiber waveguide being contained in an air-tight chamber filled with a gas at a given pressure,
wherein the length of the hollow fiber is such that, for a given input pulse energy and gas pressure, the energy contained in a fundamental propagation mode, $LP_{01}$, of the optical pulses, focused into the hollow fiber waveguide, that has minimum propagation losses, exhibits substantially periodic oscillations over the full length of the hollow fiber waveguide and reaches a local maximum at the output end of the said hollow fiber waveguide.

2. The device according to claim 1, wherein the length of the hollow fiber waveguide is substantially equal to an even integer multiple of a phase-mismatch length $L_{p12}$, with $$L_{p12}=2\times10^{-6}\times a^2, \text{where}$$

a is the radius of the hollow fiber waveguide.

3. The device according to claim 1, wherein the length of the hollow fiber waveguide is shorter than a group velocity mismatch-length $L_{v12}$, with $$L_{v12}=2\tau_{FWHM}cL_{p12}/\lambda_0=4\times10^{-6}\tau_{FWHM}ca/\lambda_0, \text{where}$$

a is the radius of the hollow waveguide;
$\lambda_0$ is the carrier wavelength of the pulse to be compressed;
$L_{p12}$ is the phase-mismatch length,
$\tau_{FWHM}$ is the full width at half maximum duration of the pulse to be compressed; and
c is the speed of light in vacuum.

4. The device according to claim 3, wherein the length of the hollow fiber waveguide is substantially equal to an even integer multiple of a phase-mismatch length $L_{p12}$, with $$L_{p12}=2\times10^{-6}\times a^2, \text{where}$$

a is the radius of the hollow fiber waveguide.

5. The device according to claim 1, wherein the hollow fiber waveguide is made of fused silica.

6. The device according to claim 1, wherein the hollow fiber waveguide is made of BK7 glass.

7. The device according to claim 1, wherein the hollow fiber waveguide is a cylindrical tube.

8. The device according to claim 1, wherein the hollow fiber waveguide has a cylindrical section and a substantially conical section at the input end, the optical pulses being coupled into the conical input end of the hollow fiber waveguide.

9. The device according to claim 1, wherein the hollow fiber waveguide has an axis of symmetry, and is cleaved under an angle different from 90° with respect to the axis of symmetry.

10. The device according to claim 1, wherein the hollow fiber waveguide is filled with a gas selected of the group of gases, including Xe, Kr, Ar, Ne, He, N2, air or combinations thereof.

11. An arrangement for reducing the duration of optical pulses comprising a device for increasing the bandwidth of optical pulses according to claim 1 and a group delay dispersion compensation device.

12. The arrangement according to claim 11, wherein the group delay dispersion compensation device comprises one or more elements of the group comprising prism pairs, grating pairs, dispersive mirrors, and combinations thereof.

13. The arrangement according to claim 12, wherein the group delay dispersion compensation device comprises grating pairs and prism pairs.

14. The arrangement according to claim 12, wherein the group delay dispersion compensation device comprises dispersive mirrors and one or more prism pairs.

15. A method for reducing the duration of optical pulses comprising the steps of:
coupling light pulses by means of focusing optics into a hollow fiber waveguide that has an input end and an output end, and is contained in an air-tight chamber filled with a gas,
setting the length of the hollow fiber waveguide such that, for a given input pulse energy and gas pressure, the energy contained in a fundamental propagation mode, $LP_{01}$, that has minimum propagation losses exhibits substantially periodic oscillations over the full length of the hollow fiber waveguide and reaches a local maximum at the output end of the hollow fiber waveguide;
enlarging the bandwidth of the said optical pulses by means of nonlinear propagation in the gas-filled hollow fiber waveguide;
spatially re-collimating the optical pulses by optical means after exiting at the output end of the hollow fiber waveguide and the air-tight chamber; and
propagating the spectrally broadened optical pulses through a group delay dispersion compensation device where their duration is reduced.

16. The method according to claim 15, wherein the length of the hollow fiber waveguide is determined to be substantially equal to an integer multiple of a phase-mismatch length $L_{p12}$ which is given by $L_{p12}=2\times10^{-6}\times a^2$,
where a is the radius of the hollow fiber waveguide.

17. The method according to claim 15, wherein the length of the hollow fiber waveguide is shorter than the group velocity mismatch length $L_{v12}$, with $$L_{v12}=2\tau_{FWHM}cL_{p12}/\lambda_0=4\times10^{-6}\tau_{FWHM}ca/\lambda_0,$$

where a is the radius of the hollow waveguide;
$\lambda_0$ is the carrier wavelength of the pulse to be compressed;
$L_{p12}$ is the phase-mismatch length,
$\tau_{FWHM}$ is the full width at half maximum duration of the pulse to be compressed; and
c is the speed of light in vacuum.

18. The method according to claim 15, wherein the hollow fiber waveguide is made of fused silica.

19. The method according to claim 15, wherein the hollow fiber waveguide is made of BK7.

20. The method according to claim 15, wherein the hollow fiber waveguide is a cylindrical tube.

21. The method according to claim 15, wherein the hollow fiber waveguide has a cylindrical section, and has a conical section at the input end, the light being coupled in at the conical input end.

22. The method according to claim 21, wherein coupling of the optical pulses into the hollow fiber waveguide is achieved by focusing the optical pulses to a diameter equal to 60-80% percent of the diameter of the cylindrical section of the hollow fiber waveguide.

23. The method according to claim 21, wherein coupling of the optical pulses into the hollow fiber waveguide is achieved by focusing the optical pulses to a diameter equal to 60-80% percent of the maximum diameter of the conical section of the hollow fiber waveguide.

24. The method according to claim 15, wherein the hollow fiber waveguide is filled with a gas selected of the group of gases, including Xe, Kr, Ar, Ne, He, N2, air or combinations thereof.

* * * * *